(12) United States Patent
Low et al.

(10) Patent No.: US 7,453,042 B2
(45) Date of Patent: Nov. 18, 2008

(54) CABLE AND APPARATUS INTERCONNECTION CLOSE QUARTERS ENVIRONMENTAL SEAL

(75) Inventors: David Low, New Lenox, IL (US); Albert Cox, Orland Park, IL (US); Richard Korczak, Channahon, IL (US)

(73) Assignee: Andrew LLC, Hickory, NC (US)

( * ) Notice: Subject to any disclaimer, the term of this patent is extended or adjusted under 35 U.S.C. 154(b) by 0 days.

(21) Appl. No.: 11/733,150

(22) Filed: Apr. 9, 2007

(65) Prior Publication Data

US 2008/0245547 A1  Oct. 9, 2008

(51) Int. Cl.
*H02G 15/08* (2006.01)
(52) U.S. Cl. ......................................................... 174/93
(58) Field of Classification Search .................. 174/93; 138/124, 140, 147
See application file for complete search history.

(56) References Cited

U.S. PATENT DOCUMENTS

| | | | |
|---|---|---|---|
| 4,084,066 A | 4/1978 | Gillemot | |
| 4,675,512 A * | 6/1987 | Doucet et al. | 219/535 |
| 4,733,019 A * | 3/1988 | Pichler et al. | 174/92 |
| 4,860,799 A * | 8/1989 | Van Noten | 138/167 |
| 4,880,676 A | 11/1989 | Puigcerver et al. | |
| 4,888,070 A | 12/1989 | Clark et al. | |
| 4,944,976 A | 7/1990 | Plummer, III | |
| 5,099,088 A | 3/1992 | Usami et al. | |
| 5,214,248 A | 5/1993 | Jamison | |
| 5,382,756 A | 1/1995 | Dagan | |
| 5,456,959 A | 10/1995 | Dawes | |
| 5,505,230 A | 4/1996 | Bartholomew | |
| 5,525,073 A | 6/1996 | Sampson | |
| 5,561,269 A | 10/1996 | Robertson et al. | |
| 5,684,274 A | 11/1997 | McLeod | |
| 5,824,956 A | 10/1998 | Garban et al. | |
| 5,844,171 A | 12/1998 | Fitzgerald | |
| 5,947,159 A * | 9/1999 | Takahashi | 138/156 |
| 6,037,544 A | 3/2000 | Lee et al. | |
| 6,087,593 A | 7/2000 | Skipworth et al. | |
| 6,177,634 B1 | 1/2001 | Smith | |
| 6,280,235 B1 | 8/2001 | Radliff | |
| 6,359,228 B1 | 3/2002 | Strause et al. | |
| 6,545,219 B1 | 4/2003 | Bukovnik et al. | |
| 6,706,968 B2 | 3/2004 | Yaworski et al. | |
| 6,730,846 B1 | 5/2004 | Muller | |
| 6,948,976 B2 | 9/2005 | Goodwin et al. | |
| 6,955,558 B1 | 10/2005 | Low et al. | |
| 7,141,738 B2 | 11/2006 | Marsac et al. | |

* cited by examiner

*Primary Examiner*—Chau N Nguyen
(74) *Attorney, Agent, or Firm*—Babcock IP, PLLC

(57) ABSTRACT

A sealing assembly for a cable to apparatus electrical interconnection. The assembly having a unitary cylindrical gasket, the outer diameter of the cylindrical gasket provided with an insertion opening to an interconnection cavity; the insertion opening having a generally circle sector shape at a cable end and an apparatus end, the insertion opening extending between the cable end and the apparatus end along the outer diameter. A generally C-shaped outer shell is dimensioned to seat along the outer diameter, the outer shell having outward protruding edge lips aligned with the insertion opening along the outer diameter. The edge lips movable towards one another to a closed position wherein the insertion opening is closed around the electrical interconnection; and means for retaining, such as a locking bar that fits over the edge lips.

15 Claims, 11 Drawing Sheets

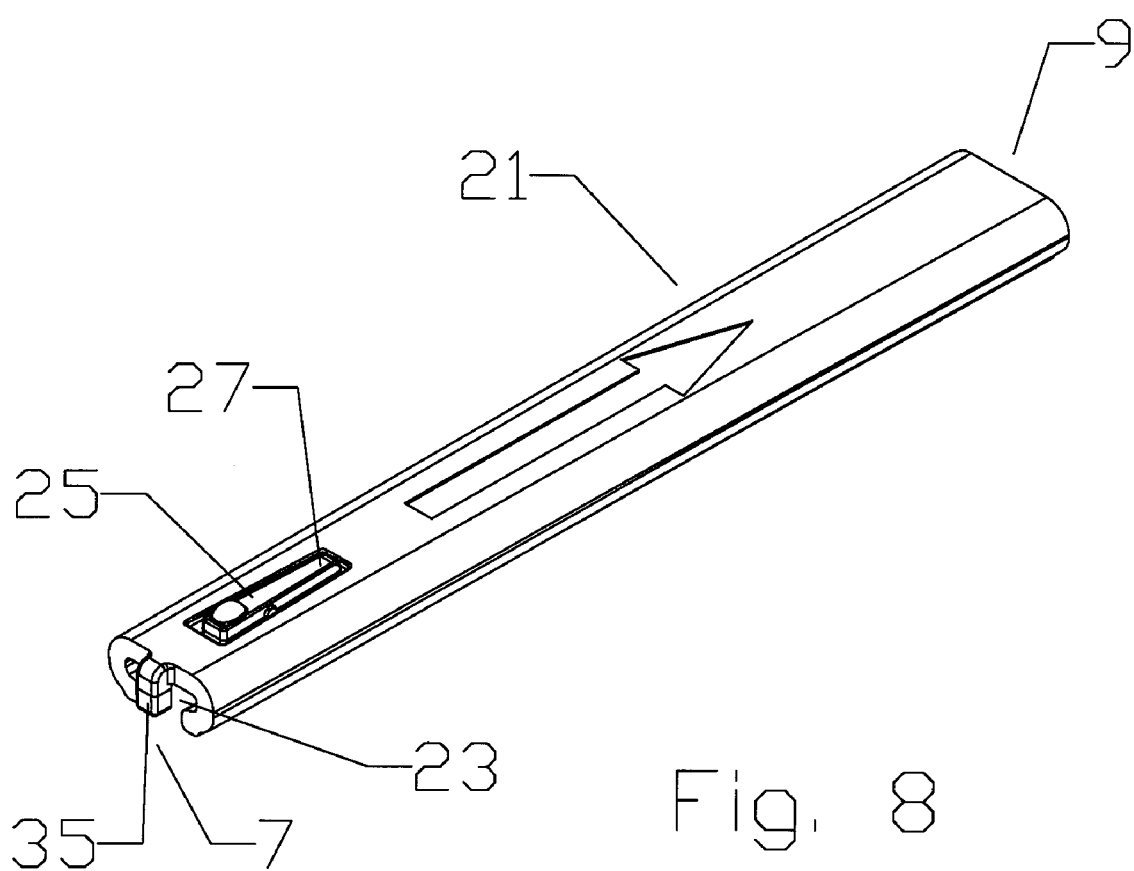

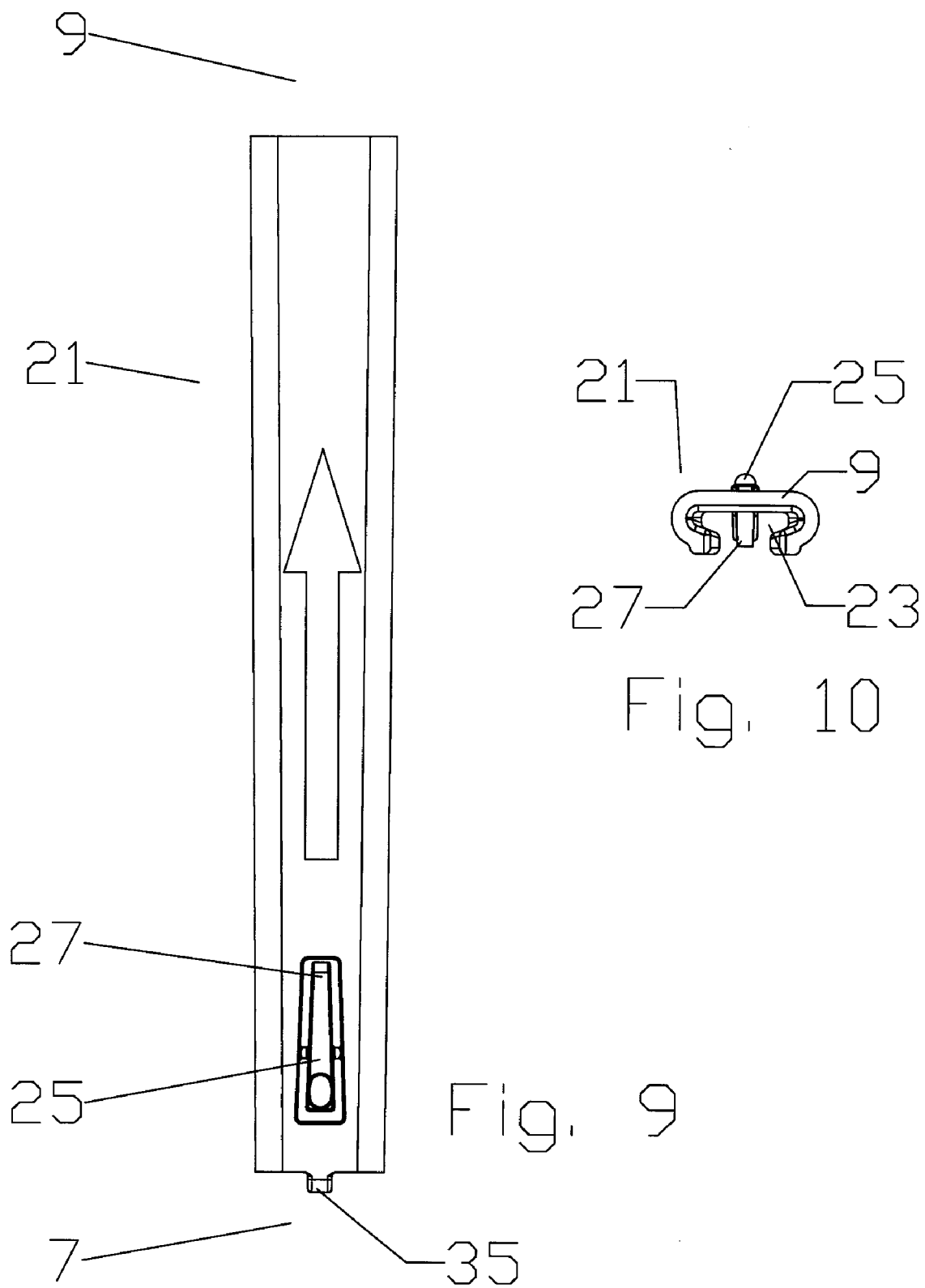

CABLE AND APPARATUS INTERCONNECTION CLOSE QUARTERS ENVIRONMENTAL SEAL

BACKGROUND

1. Field of the Invention

The invention relates to sealing an electrical interconnection between a cable and an apparatus, for example a feed and or control cables interconnected with an antenna. More particularly, the invention provides a tool-less weatherproof environmental seal assembly for a cable to apparatus electrical interconnection that is installable in close quarters situations with limited access space around the electrical interconnection.

2. Description of Related Art

Electrical interconnections are subject to degradation from environmental factors such as moisture, vibration and repeated expansion and contraction from daily temperature changes.

Connections to an apparatus, for example an antenna, are typically made to a connector body mounted to an exterior surface of the antenna. Because the connector body is flush against a surface, a cable to cable interconnection sealing assembly that tapers at either end to a cable diameter is unusable. Further, typical cable to cable interconnection solutions apply a sealing filler to fill the area within the interconnection space creating a permanent rather than easily removable and re-usable seal.

Prior reusable environmental and or security seals with an outer enclosure that surrounds an electrical interconnection between the connector at a cables end and an apparatus have typically been configured as a rigid polymeric surrounding enclosure with gaskets attached to seal the enclosure mating edges and around the cable and apparatus ends. U.S. Pat. No. 6,948,976 to Goodwin et al, issued Oct. 18, 2005, discloses an environmental seal with a snap together enclosure configuration having a snap together threaded nut that compresses a cable end gasket. U.S. Pat. No. 6,955,558 to Low et al, issued Sep. 27, 2005, discloses an environmental seal with hinged portions that are folded around the interconnection. Both of these prior solutions require a significant attachment space immediately around the interconnection to either snap or fold together the solid enclosure and in the case of U.S. Pat. No. 6,948,976 to thread on the cable end gasket compression nut.

It is increasingly common for apparatus, for example cellular communications base station antennas, to a have multiple cable connections with minimal spacing between them, as well as apparatus mounted connector interfaces having a minimal neck length around which the environmental seal must be applied.

Competition within the electrical interconnection environmental seal market segment has focused attention on reliability, re-usability, ease of use and overall reductions in manufacturing and installation costs.

Therefore, it is an object of the invention to provide an apparatus that overcomes deficiencies in the prior art.

BRIEF DESCRIPTION OF THE DRAWINGS

The accompanying drawings, which are incorporated in and constitute a part of this specification, illustrate embodiments of the invention, and together with a general description of the invention given above, and the detailed description of the embodiments given below, serve to explain the principles of the invention.

FIG. 8 is an angled side isometric view of a locking bar according to the exemplary embodiment of the invention.

FIG. 9 is schematic top view of FIG. 8.

FIG. 10 is a schematic apparatus end view of FIG. 8.

DETAILED DESCRIPTION

Figure 1:
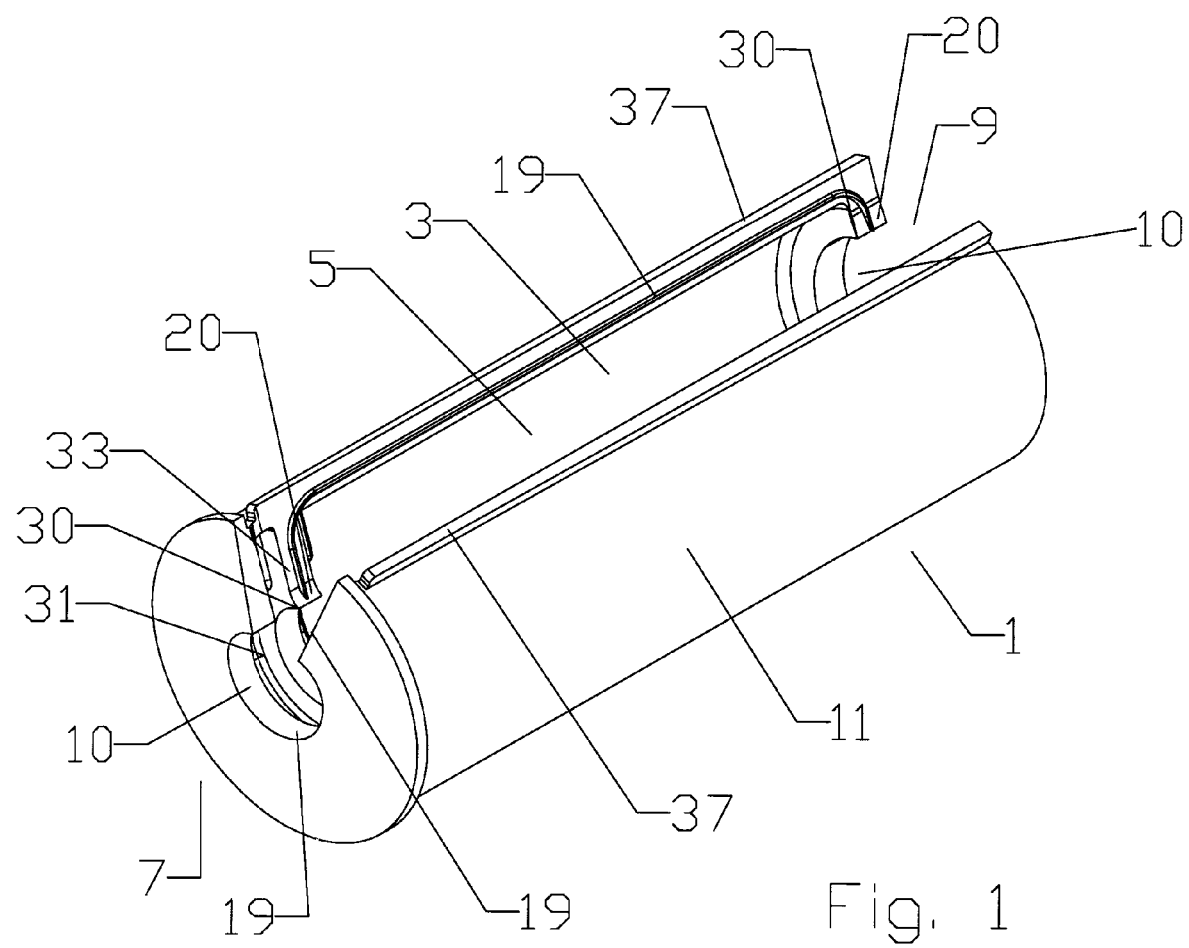
FIG. 1 is an angled side isometric view of a cylindrical gasket according to the exemplary embodiment of the invention.

As best shown by FIGS. 1-4, a sealing assembly according to an exemplary embodiment of the invention has a unitary cylindrical gasket 1 with an insertion opening 3 to an interconnection cavity 5; the insertion opening 3 having a generally circle sector shape at a cable end 7 (FIG. 3) and an apparatus end 9 (FIG. 4), the insertion opening 3 extending between the cable end 7 and the apparatus end 9 along the outer diameter 11 of the cylindrical gasket 1.

The cylindrical gasket 1 is preferably formed as a unitary portion from a material with deformable and elastic properties, such as rubber or other elastomers.

The insertion opening circle sector(s) at the cable end 7 and the apparatus end 9 each have a central aperture 10 dimensioned to seat upon the diameter of the expected respective cable 12 and apparatus 15 electrical interconnection 17 around which the sealing assembly will be sealed. The apparatus 15 is demonstrated as a surface mountable connector interface. The connector interface is typically mounted projecting through an exterior surface of a larger apparatus module, such as an antenna, not appearing in the figures.

Figure 2:
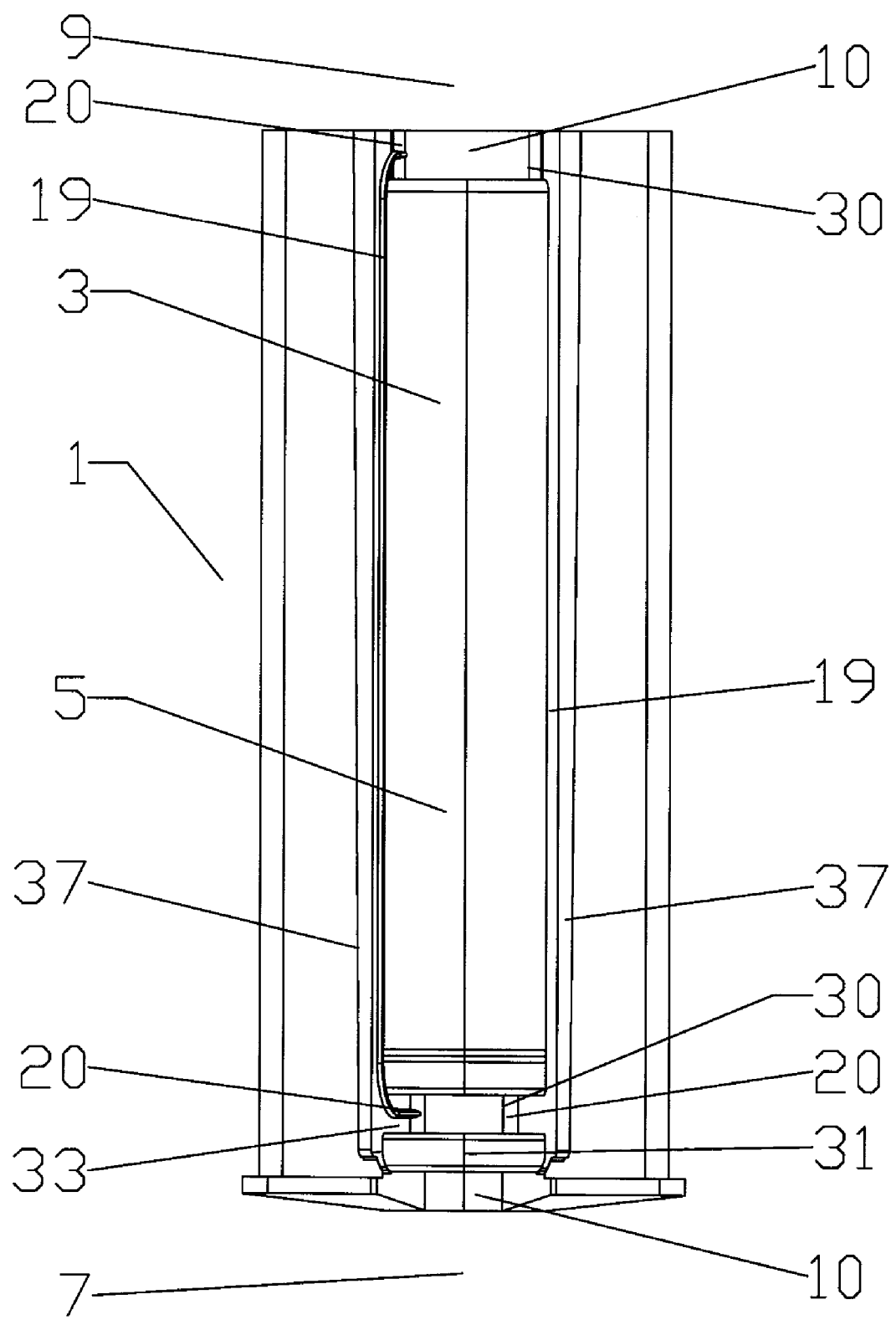
FIG. 2 is schematic top view of FIG. 1.
Figure 3:
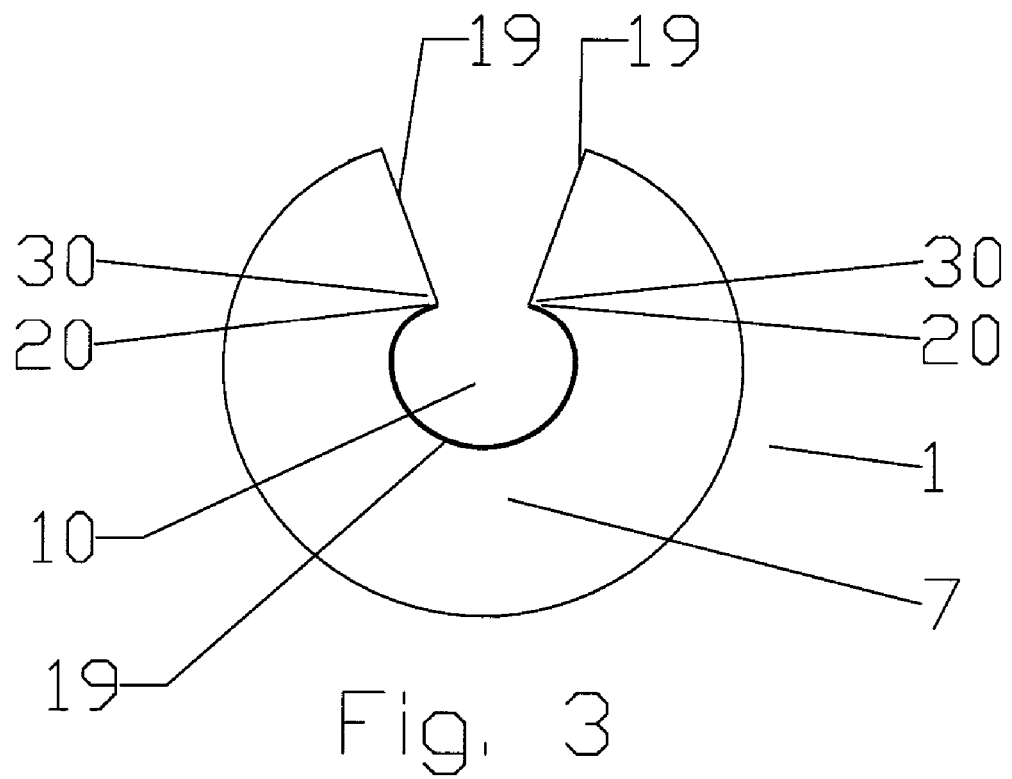
FIG. 3 is a schematic cable end view of FIG. 1.
Figure 4:
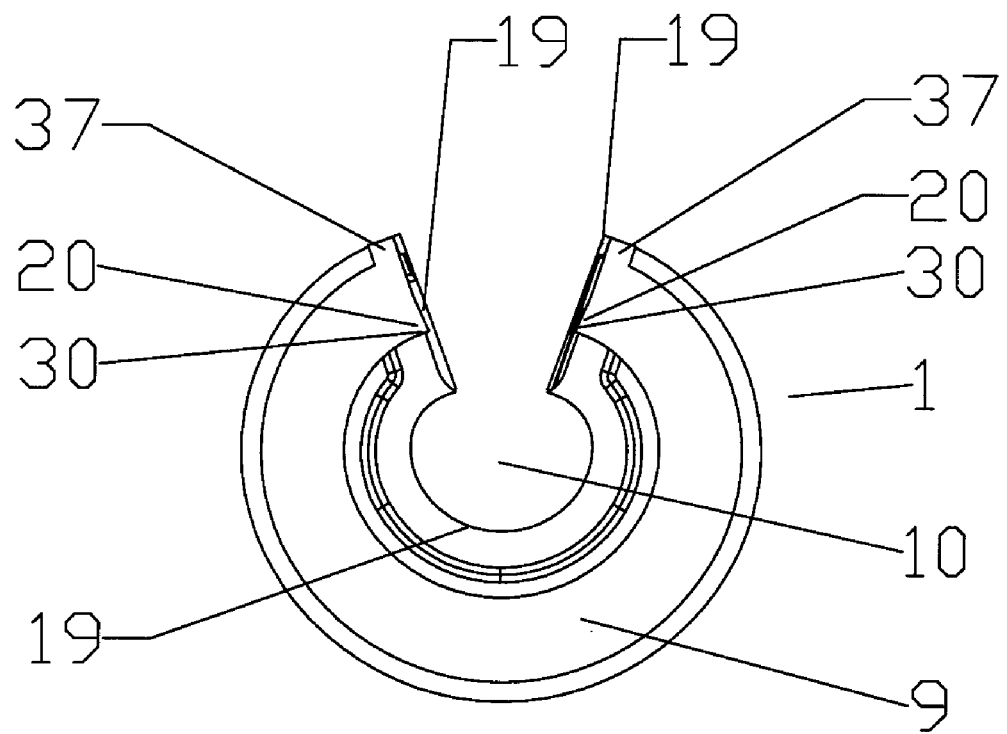
FIG. 4 is a schematic apparatus end view of FIG. 1.

The seal of the sidewall(s) 19 against the cable 12 and electrical interconnection 17 and against each other may be improved by forming compensation spike(s) 20, best shown in FIGS. 1 and 2, in the sidewalls at a transition area 30 where the sidewall changes from sealing against the cable 12 and apparatus 15 to sealing against the opposing sidewall 19. The compensation spike(s) 20 are formed as additional projections beyond the material calculated to provide a side to side or side to surface contact. The compensation spike(s) 20 provide extra material in the sealing area, increasing sealing pressure in an area that otherwise has been observed to be a primary failure point of this form of seal.

A further improvement of the seal may be applied in the form of a leak cavity 31, demonstrated in the exemplary embodiment, for example, at the cable end 7. Although the space available at the apparatus end is typically limited due to the dimensions of the apparatus 15, a leak cavity 31 may also be formed with respect to the apparatus end 9. As best shown in FIGS. 1 and 2, the leak cavity 31 has leak sidewall(s) 33 that seal against the cable 12 and against one another to isolate the leak cavity 31 from the interconnection cavity 5 when the sealing assembly is in the closed position. Compensation spike(s) 20 may also be applied to the leak sidewall(s) 33 at the corresponding transition area 30. For a leak to penetrate through the cable end 7 into the interconnection cavity 5, it must first pass through the leak cavity 31 without the assistance of, for example, wind that may act upon the exterior sidewall 19 seals at the cable end 7.

Figure 5:
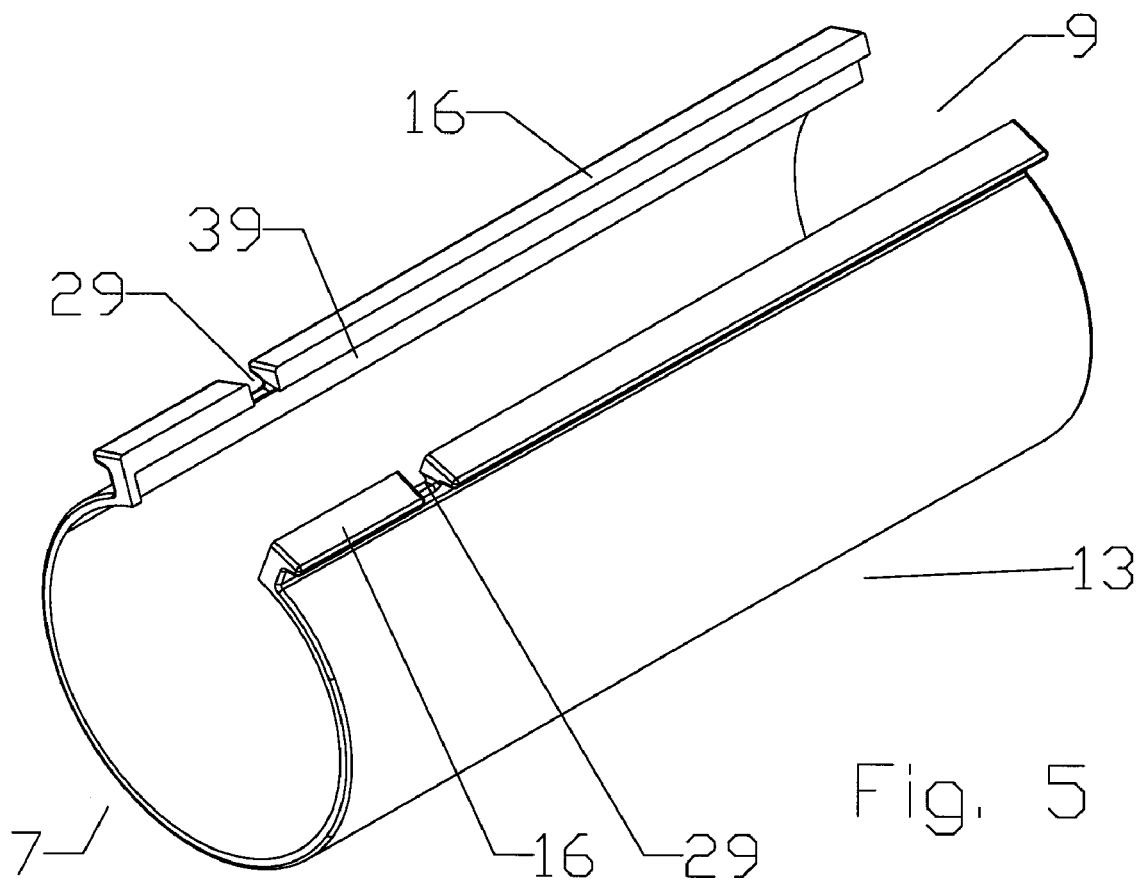
FIG. 5 is an angled side isometric view of an outer shell according to the exemplary embodiment of the invention.
Figure 6:
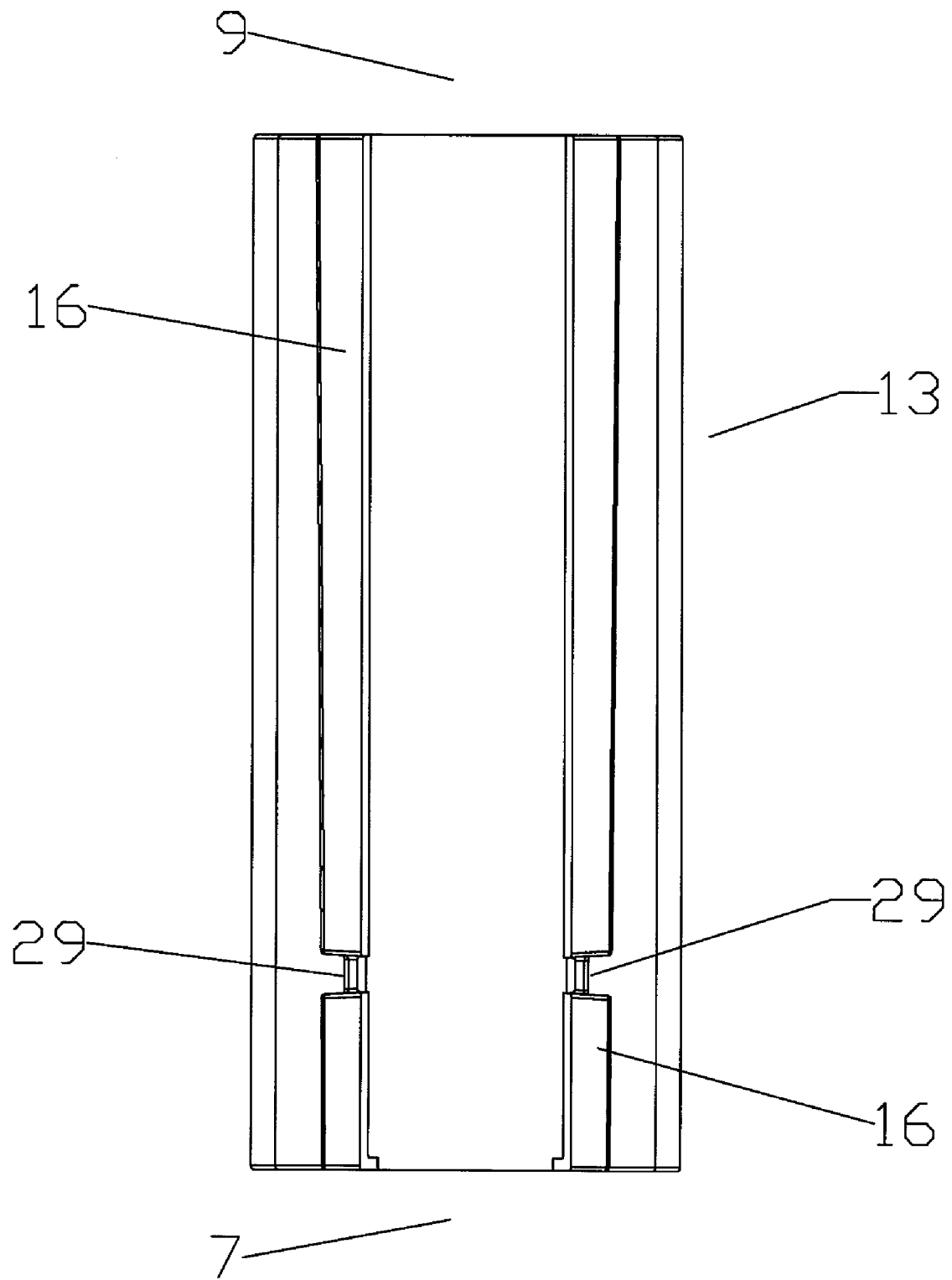
FIG. 6 is schematic top view of FIG. 5.
Figure 7:
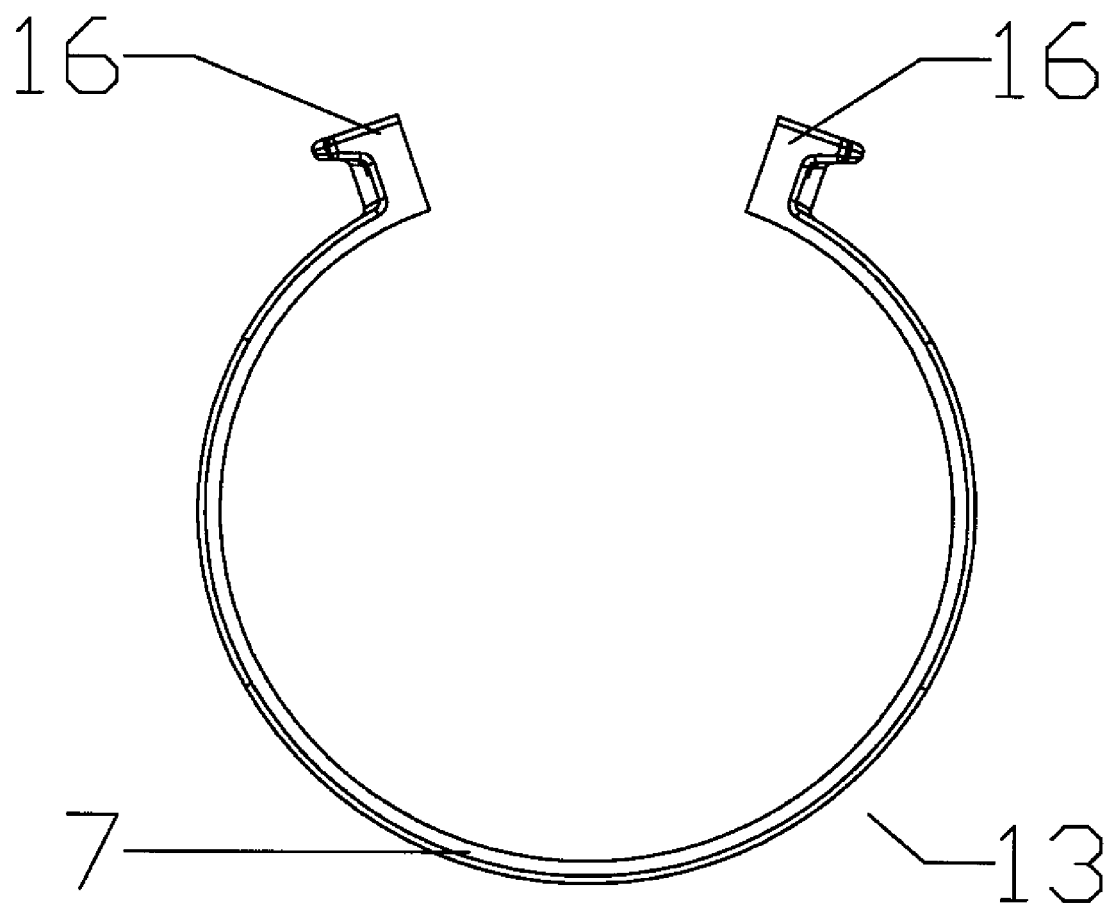
FIG. 7 is a schematic cable end view of FIG. 5.

As best shown in FIGS. 5-7, a generally C-shaped outer shell 13 is dimensioned to seat along the outer diameter 11 of the cylindrical gasket 1, the outer shell 13 having outward protruding edge lip(s) 16 aligned with the insertion opening 3 along the outer diameter 11. The outer shell 13 is semi-flexible, for example formed of a sheet metal or polymeric material. The flexibility of the outer shell 13 allows the edge lip(s) 16 to be spread apart to allow seating of the outer shell 13 over the cylindrical gasket 1. Then, the edge lip(s) 16 may be drawn towards one another to a closed position, closing the insertion opening 3 around the electrical interconnection 17, sealing the sidewall(s) 19 of the insertion opening against and around the cable 12 at the cable end 7, against and around the apparatus 15 at the apparatus end 9 and the remaining sidewall(s) 19 against one another to seal the electrical interconnection 17 within the interconnection cavity 5.

The edge lip(s) 16 may be retained in the closed position by a means for retaining such as a locking bar 21, as best shown in FIGS. 8-10, interlocking fingers, snaps or tabs that mate into corresponding slots.

The locking bar of the exemplary embodiment is formed with a retaining slot 23, the retaining slot 23 dimensioned for longitudinal insertion of the edge lip(s) 16 in the drawn together closed position. To prevent the locking bar 21 from sliding off in the longitudinal direction from which it is inserted, a means for securing such as a torsion snap 25 may be formed integral with the locking bar 21; the torsion snap 25 operable to lever an engagement end 27 of the torsion snap 25 towards or away from engaging a corresponding gap 29 or protrusion(s) of the edge lip(s) 16, locking or unlocking the locking bar 21 with respect to the edge lip(s) 16.

Alternative means for securing include, for example, pins, snaps, tabs mating with slots and or protrusions such as hooks and wedges dimensioned to interlock with gap(s) 29 or protrusion(s) in the corresponding surface of the edge lip(s) 16.

For ease of initial insertion, the edge lip(s) 16 and retaining slot 23 may each be formed with a corresponding taper between a minimum width at the cable end 7 and a maximum width at the apparatus end 9. Via the tapers, the initial mating of the locking bar 21 upon the edge lip(s) 16, apparatus end 9 of locking bar 21 to cable end 9 of edge lip(s) 16 is between the widest portion of the retaining slot 23 and the narrowest portion of the edge lip(s) 16.

To prevent insertion of the locking bar beyond a fully inserted position an end stop 35, against which the cable end 7 of the edge lip(s) 16 will abut when fully inserted into the retaining slot 23, may be applied to the cable end 7 of the locking bar 21.

Figure 11:
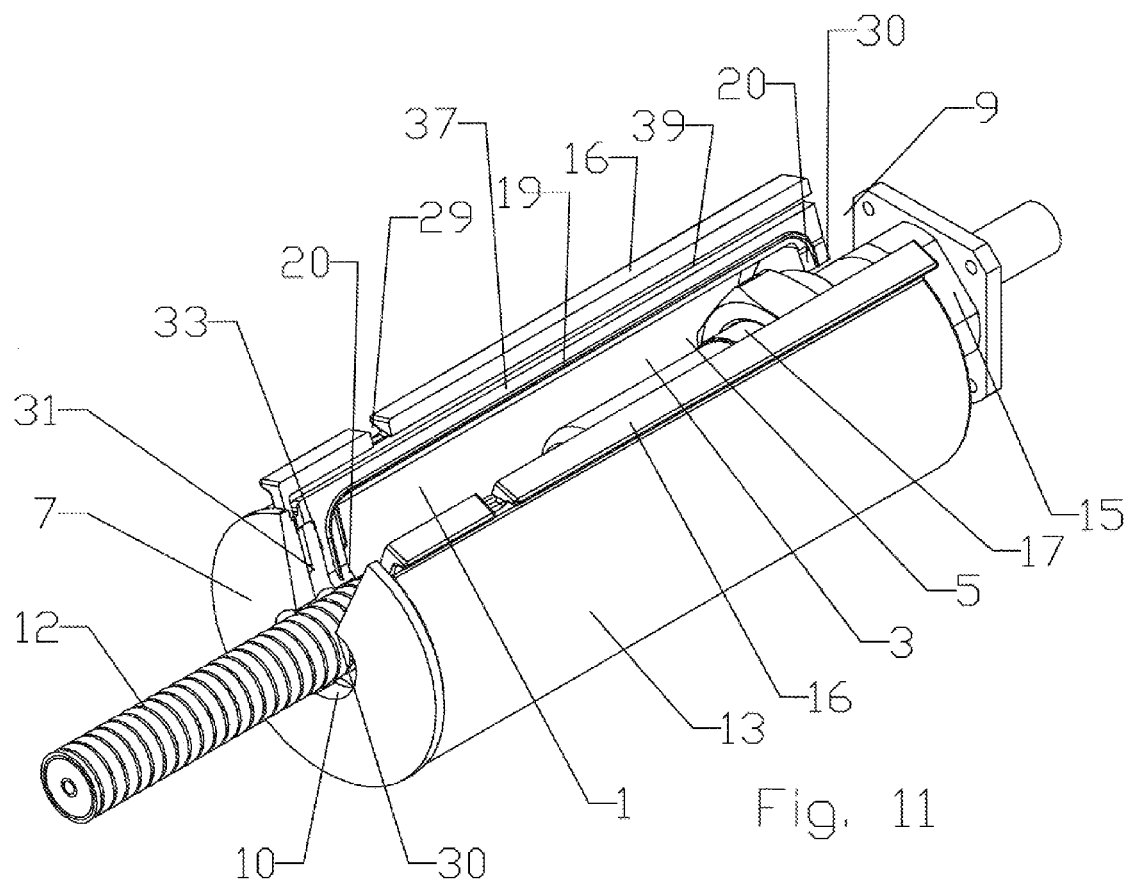
FIG. 11 is an angled side isometric view of a sealing assembly upon a cable to apparatus electrical interconnection ready for closure of the lip edges into the closed position, according to the exemplary embodiment of the invention.
Figure 12:
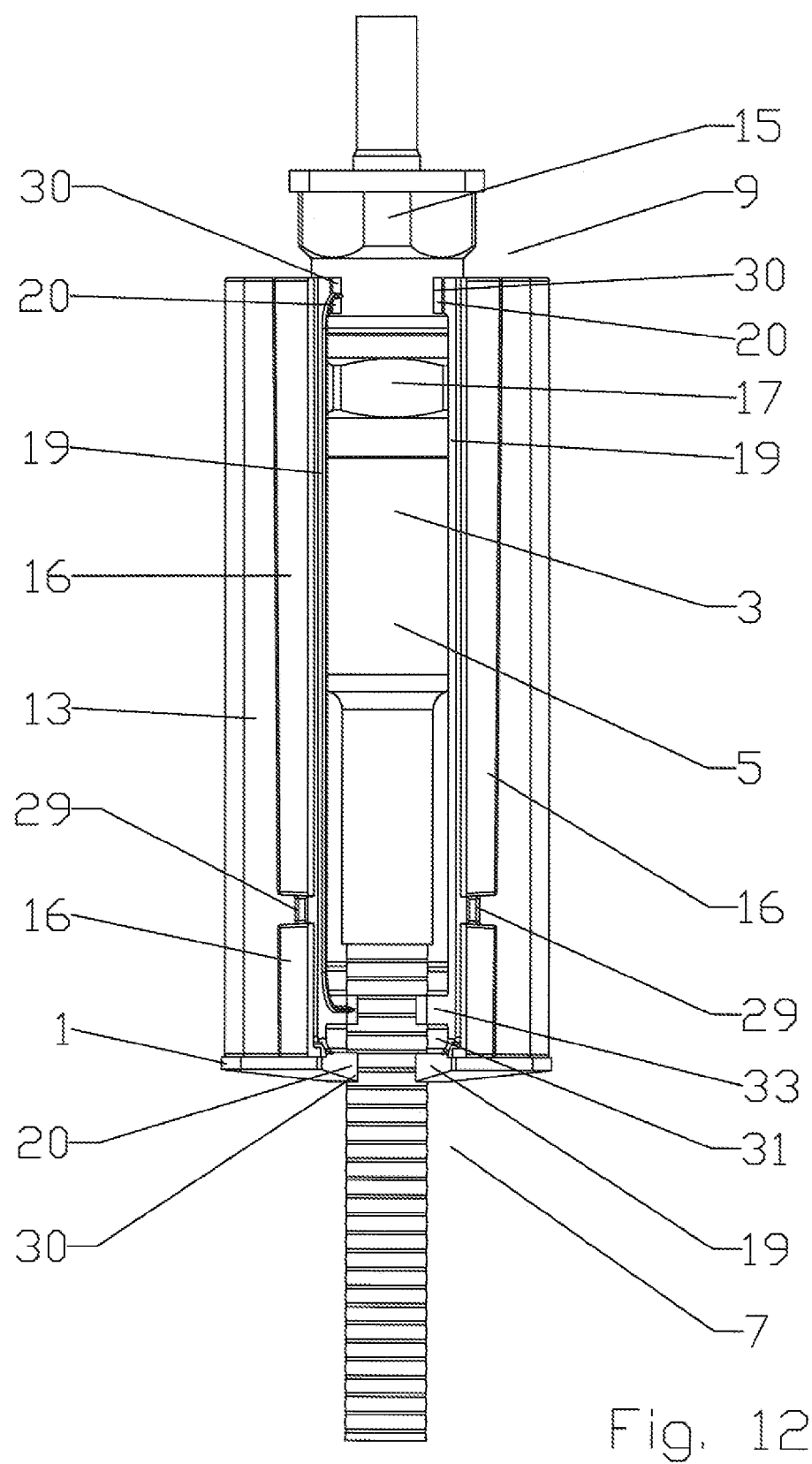
FIG. 12 is a schematic top view of FIG. 11.
Figure 13:
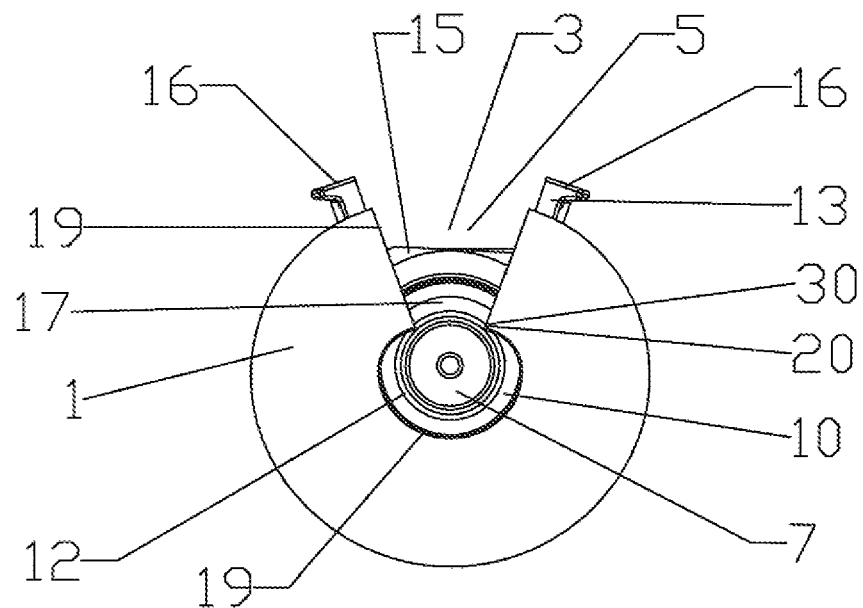
FIG. 13 is a schematic end view of FIG. 11.
Figure 14:
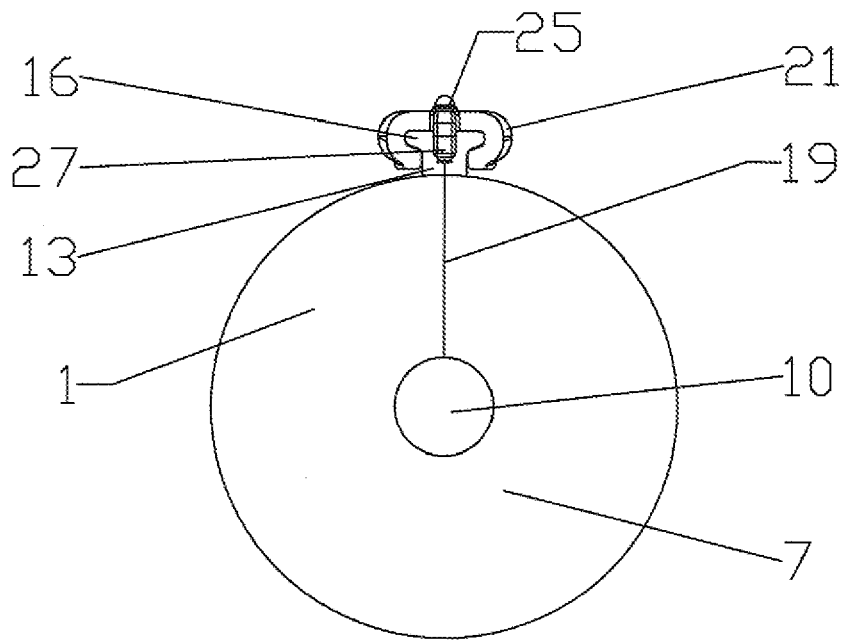
FIG. 14 is a schematic end view of a sealing assembly in the closed position with a locking bar installed, according to the exemplary embodiment of the invention.

As shown in FIGS. 11-13, the insertion opening 3 is dimensioned to allow the cylindrical gasket 1 to be placed over the electrical interconnection 17 while requiring minimal distortion of the cylindrical gasket 1, but not so large that the sidewall(s) 19 of the insertion opening 3 can not be easily pulled towards one another as the insertion opening 3 is drawn toward a closed position. For example, the circle sector preferably has an arc length of less than 90 degrees. FIG. 13 also demonstrates how the central aperture 10 portions of the insertion opening 3 at the cable and apparatus ends 7, 9 are dimensioned for ease and evenness of sealing as the edge(s) 16 are drawn together into the closed position, demonstrated by FIG. 14.

To assist with and guide the sidewall(s) 19 towards one another, as the edge lip(s) 16 are drawn to each other, the cylindrical gasket 1 may be keyed to the outer shell 13 by protruding edge(s) 37 formed along the sidewall(s) 19 along the outer diameter 11. The protruding edge(s) 37 may be keyed to the edge lip(s) 16, for example by a shoulder 39 formed in the edge lip(s) 16 dimensioned to receive the protruding edge(s) 37. Thereby, as the outer shell 13 edge lip(s) are drawn towards one another, the insertion opening 3 is uniformly drawn to a close from the outer diameter 11 sidewall(s) 19, limiting the chance for the sidewall(s) 19 to skew with respect to each other, enabling a uniform seal there along. Alternative forms of keying between the cylindrical gasket 1 and the outer shell 13 include protruding fins or studs that mate with corresponding apertures or depressions formed in the outer shell 13.

To ease initial insertion friction and improve the seating action of the gasket around the cable 12 and apparatus 15 surfaces, a lubricant may be applied along the sidewall(s) 19 before assembly. The lubricant may be, for example, silicon grease.

In use, the sealing assembly according to the invention may be assembled around the electrical interconnection 17 by either snapping the cylindrical gasket 1 around and into place upon the electrical interconnection 17 or attached to the cable 12 a distance from the electrical interconnection and then slid along the cable 12 until it passes over the electrical interconnection 17 and seats against the apparatus 15, typically about a connector shoulder. The outer shell 13 is similarly placed over or slid along the cable 12 and over the outer diameter 11 of the cylindrical gasket 1, the edge lip(s) 16 of the outer shell 13 aligned with the sidewall(s) 19 of the insertion opening 3. The edge lip(s) 16 are drawn towards one another, closing the insertion opening 3 around the electrical interconnection 17, sealing the sidewall(s) 19 against the cable 12 at the cable end 7, against the apparatus 15 at the apparatus end and the remaining sidewall(s) 19 against one another.

To retain the sealing assembly in the closed position, the locking bar 21 is longitudinally inserted along the edge lip(s) 16, locating the edge lip(s) 16 within the retaining slot 23 of the locking bar 21. In a torsion snap 25 means for securing embodiment, the locking bar 21 is inserted until the torsion snap 25 moves over and engages the edge lip 16 gap(s) or protrusion(s), preventing removal of the locking bar, unless the torsion snap is pressed to lever the engaging end up and away from engagement with the edge lip gap(s) 29 or protrusion(s).

One skilled in the art will appreciate that because the various elements of the sealing assembly are insertable first upon the cable at a spaced apart location from the electrical connection and or from the longitudinal direction parallel to the cable, the sealing assembly may be assembled upon an electrical interconnection 17 in close quarters with adjacent electrical connections or other interfering objects or structures that may be present, enabling the sealing of electrical connections in close quarters. Further, the sealing assembly according to the invention is reusable, has minimal material requirements and may be assembled or disassembled without tools.

From the foregoing, it will be apparent that the present invention brings to the art a sealing assembly for cable to apparatus connections having improved performance and significant manufacturing and installation cost efficiencies.

| Table of Parts | |
|---|---|
| 1 | cylindrical gasket |
| 3 | insertion opening |
| 5 | interconnection cavity |
| 7 | cable end |
| 9 | apparatus end |
| 10 | central aperture |
| 11 | outer diameter |
| 12 | cable |
| 13 | outer shell |
| 15 | apparatus |
| 16 | edge lip |
| 17 | electrical interconnection |
| 19 | sidewall |
| 20 | compensation spike |
| 21 | locking bar |
| 23 | retaining slot |
| 25 | torsion snap |
| 27 | engagement end |
| 29 | gap |
| 30 | transition area |
| 31 | leak cavity |
| 33 | leak sidewall(s) |
| 35 | end stop |
| 37 | protruding edge |
| 39 | shoulder |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. A sealing assembly for a cable to apparatus electrical interconnection, comprising:
    a unitary cylindrical gasket, the outer diameter of the cylindrical gasket provided with an insertion opening to an interconnection cavity; the insertion opening having a generally circle sector shape at a cable end and an apparatus end, the insertion opening extending between the cable end and the apparatus end along the outer diameter;
    a generally C-shaped outer shell dimensioned to seat along the outer diameter, the outer shell having outward protruding edge lips aligned with the insertion opening along the outer diameter; the edge lips movable towards one another to a closed position wherein the insertion opening is closed around the electrical interconnection; and
    a locking bar with a retaining slot; the retaining slot dimensioned for longitudinal insertion of the edge lips in the closed position; and
    a means for retaining on the locking bar.

2. The sealing assembly of claim 1, wherein the means for retaining is a torsion snap formed integral with the locking bar; the torsion snap operable to engage a gap in the edge lips.

3. The sealing assembly of claim 1, wherein the edge lips and retaining slot have a longitudinal taper between a minimum width at the cable end and a maximum width at the apparatus end.

4. The sealing assembly of claim 1, further including compensation spikes in the sidewalls at the cable end and the apparatus end, at a transition area where the sidewall(s) change from sealing against the cable or apparatus to sealing against one another.

5. The sealing assembly of claim 1, further including a leakage cavity adjacent the cable end; the leakage cavity provided with leakage cavity sidewalls that seal against the cable and against one another to isolate the leakage cavity from the interconnection cavity when the sealing assembly is in the closed position.

6. The sealing assembly of claim 1, wherein the cylindrical gasket has outward protruding edges along the sidewall of the outer diameter.

7. The sealing assembly of claim 1, wherein the apparatus end opening is adapted to surround and seal against a connector body of the apparatus.

8. The sealing assembly of claim 1, wherein the circular sector has an arc length of less than 90 degrees.

9. The sealing assembly of claim 1, wherein the cable end circular sector has a central diameter dimensioned to seal around the cable.

10. The sealing assemblies of claim 1, further including an end stop at the cable end of the locking bar.

11. A sealing assembly for a cable to apparatus electrical interconnection, comprising:
    a unitary cylindrical gasket with an insertion opening to an interconnection cavity; the insertion opening having a generally circle sector shape at a cable end and an apparatus end, the insertion opening extending between the cable end and the apparatus end along an outer diameter of the cylindrical gasket;
    a generally C-shaped outer shell dimensioned to seat along the outer diameter, the outer shell having outward protruding edge lips aligned with the insertion opening along the outer surface;
    a means for retaining the edge lips in a closed position; and
    a means for securing on the means for retaining to secure the means for retaining upon the assembly.

12. The sealing assembly of claim 11, wherein the retaining means is a locking bar with a retaining slot dimensioned to mate with the edge lips.

13. The sealing assembly of claim 12, wherein the retaining slot and the edge lips have a taper between a minimum width at the cable end and a maximum width at the apparatus end.

14. The sealing assembly of claim 11, wherein the means for securing is a torsion snap.

15. A method for attaching an environmental seal assembly to a cable and apparatus electrical interconnection, comprising the steps of:
    positioning the electrical interconnection through an insertion opening into an interconnection cavity of a unitary cylindrical gasket;
    seating a generally C-shaped outer shell around an outer diameter of the cylindrical gasket, a pair of edge lips of the outer shell aligned with an outer diameter sidewall of the insertion opening;
    drawing the edge lips towards one another, closing the insertion opening around the electrical interconnection, sealing the sidewalls against the cable at the cable end, against the apparatus at the apparatus end and the remaining sidewalls against one another;

longitudinally inserting a locking bar over the edge lips, to retain the edge lips together; and engaging a means for securing the locking bar to secure the locking bar upon the edge lips.

* * * * *